United States Patent [19]

Musil

[11] Patent Number: 4,463,295

[45] Date of Patent: Jul. 31, 1984

[54] SYNCHRONOUS ELECTRIC CONVERTER MOTOR

[75] Inventor: Rudolf V. Musil, Berlin, Fed. Rep. of Germany

[73] Assignee: Siemens Aktiengesellschaft, Munich, Fed. Rep. of Germany

[21] Appl. No.: 392,138

[22] Filed: Jun. 25, 1982

[30] Foreign Application Priority Data

Jun. 26, 1981 [DE] Fed. Rep. of Germany ....... 3126318

[51] Int. Cl.³ ............................................... H02P 1/28
[52] U.S. Cl. .................................... 318/436; 318/709
[58] Field of Search .............. 318/436, 430, 431, 709, 318/723, 706, 707, 708, 384

[56] References Cited

U.S. PATENT DOCUMENTS 1,937,371 11/1933 Willis et al. .......................... 318/138
1,966,940 7/1934 Willis .................................. 318/709

Primary Examiner—David Smith, Jr.
Attorney, Agent, or Firm—Kenyon & Kenyon

[57] ABSTRACT

An electric converter motor of synchronous design is used as a hoist by supplying two legs of the stator winding with DC current from a frequency converter to maintain the field during standstill. The converter is connected to the power network.

1 Claim, 1 Drawing Figure

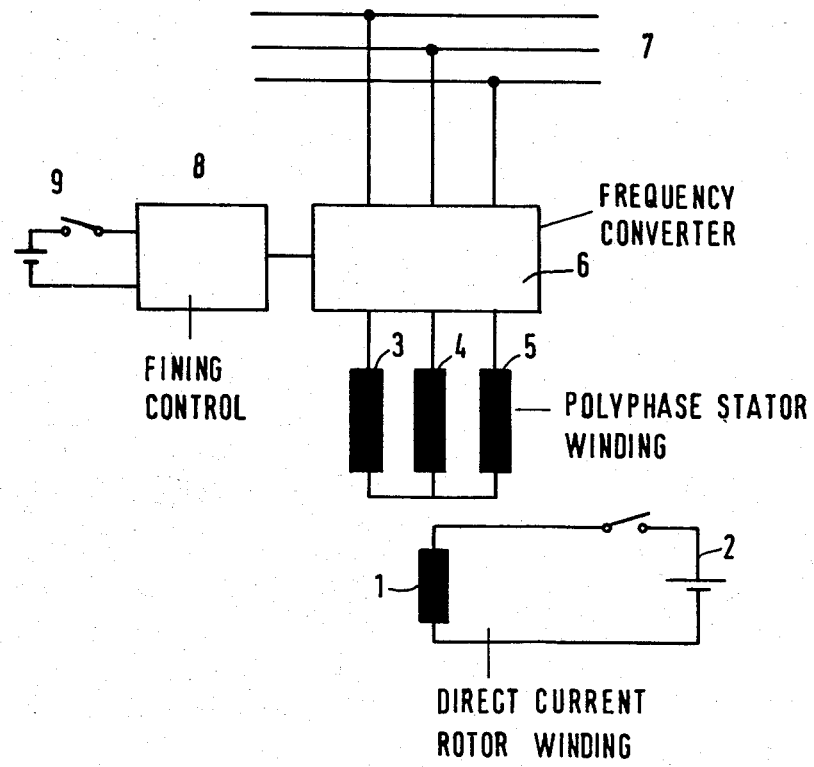

SYNCHRONOUS ELECTRIC CONVERTER MOTOR

BACKGROUND OF THE INVENTION

This invention relates to an electric converter motor of synchronous design which is connected to a power network via a frequency converter and which has a rotor with a field winding which is supplied from a DC source.

Converter motors of this kind are described, for instance, in the book of Siemens Aktiengesellschaft by Erich Eder "Stromrichter zur Drehzahlsteuerung von Drehfeldmaschinen (Industrieelektronik)", Part 4, "Der Stromrichtermotor," particularly on page 20. Converter motors of this type retain the simple design of a synchronous machine, yet can be controlled like a DC machine. Various known types of frequency converters, such as direct converters or converters having an intermediate DC link, can be connected between the power network and the machine. Suitable control means bring about the desired operating behavior of the machine.

Converter motors of this type, in the higher power ratings, are particularly useful as hoists. When used in a hoist, the machine must remain excited continuously, even while at standstill, so that it can be started up at any time without any delay for the building up of the field. However, the constant supply of field current to the field winding of the rotor, via the brushes and slip rings, while the machine is at standstill, subjects the brushes of the converter motor to increased wear.

SUMMARY OF THE INVENTION

According to the invention, the above problem is solved in a converter motor of the type described at the outset by feeding two legs of the stator winding with DC current from the converter when the machine is standing still. Supplying the stator winding with DC current in this manner maintains the field of the machine in the same way as DC current fed to the rotor winding, but does not have the disadvantageous effect of wear just described. The converter is controlled so that DC current is carried from the network to the two legs of the stator winding by making associated converter elements conduct. When the machine is to be started, field current is fed to the rotor field winding in the usual way and can be increased therein; when braking, the field current in the rotor field winding can similarly be decreased.

BRIEF DESCRIPTION OF THE DRAWING

The sole FIGURE is a schematic diagram of a synchronous converter motor, fabricated in accordance with the teachings of the invention.

DETAILED DESCRIPTION OF THE INVENTION

The circuit diagram of a converter motor of synchronous design is shown in the drawing. The rotor (not shown) of the synchronous machine includes rotor field winding 1 which is powered from DC current source 2. The three legs 3, 4, and 5 of the stator winding of the machine are Y-connected, being connected to power network 7 via frequency converter 6 which has converter elements controlled by firing control 8. When the synchronous machine is standing still, the DC supply to rotor field winding 1 is interrupted. At the same time, the converter elements of converter 6 are controlled, for example by activating switch 9 on firing control 8 so that a DC current flows through two legs of the stator winding, for instance, legs 4 and 5. This DC current in the stator winding maintains the field of the synchronous machine during standstill so that it can be started up at any time, without delay in the field buildup, by supplying DC current to rotor field winding 1.

What is claimed is:

1. An electric converter motor of synchronous design, for use as a hoist motor, comprising:
    a polyphase stator winding;
    a rotor field winding adapted to be coupled to a source of direct current; and
    a frequency converter having an input for connection to a power network and a polyphase output coupled to the stator winding, the frequency converter being controllable to supply DC current to two phases of the stator winding when the motor is standing still to maintain a field in the motor during stand-still, the motor remaining standing still while the DC current is supplied to said two phases.

* * * * *